Jan. 8, 1952 — L. J. SUBER — 2,581,980

ADJUSTABLE TOOLHOLDER FOR LATHES

Filed Jan. 31, 1947 — 2 SHEETS—SHEET 1

INVENTOR.
Louis J. Suber
BY
ATTYS

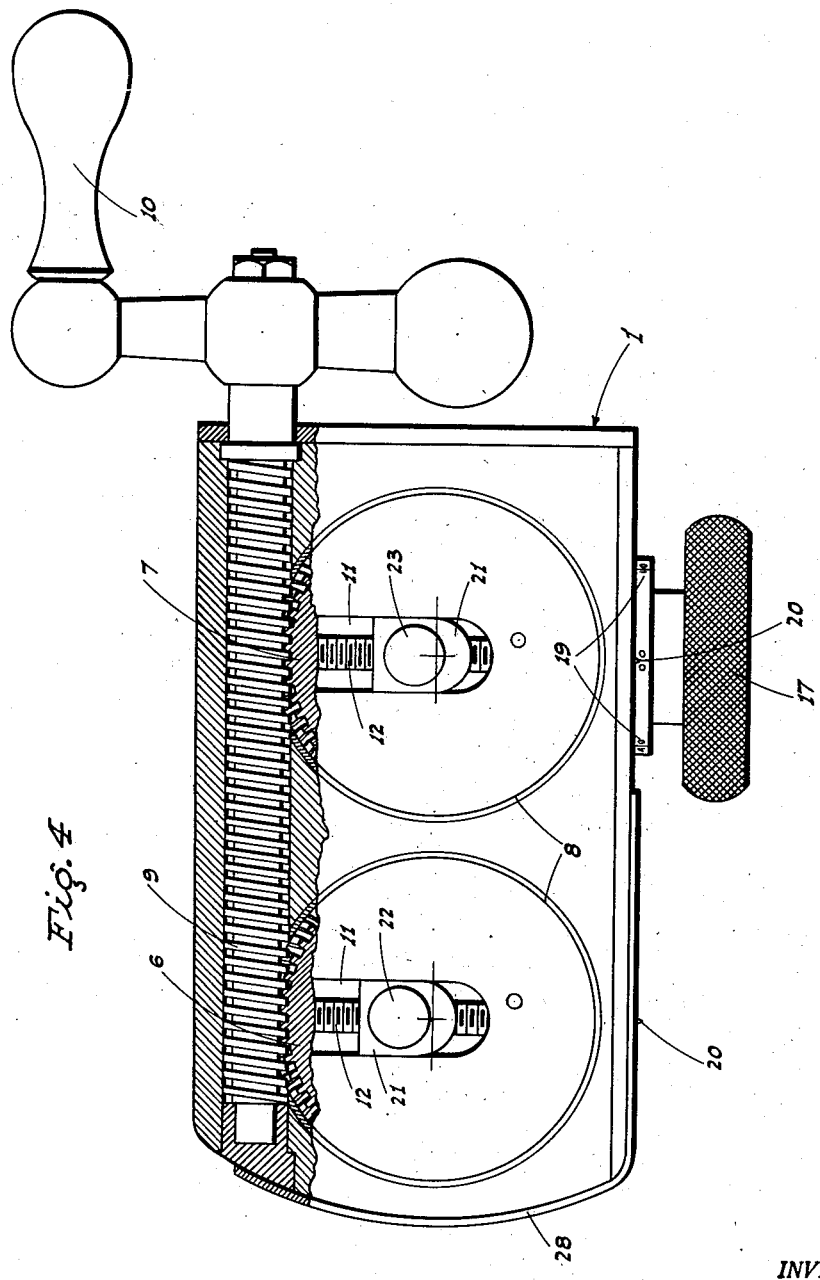

Patented Jan. 8, 1952

2,581,980

UNITED STATES PATENT OFFICE 2,581,980

ADJUSTABLE TOOLHOLDER FOR LATHES

Louis J. Suber, Vallejo, Calif.

Application January 31, 1947, Serial No. 725,473

2 Claims. (Cl. 82—12)

1

This invention is directed to, and it is an object to provide, a novel, adjustable tool holder for lathes; said tool holder being manually operative to cause the supported tool to automatically cut or shape the work convexly or concavely, and on a predetermined radii.

Another object of the invention is to provide a tool holder, as above, in which the tool actuating mechanism is adjustable so that the radius of the cut may be altered by the operator, selectively.

A further object of the invention is to provide a tool holder for lathes which comprises, in novel assembly, a tool holding bar adapted to extend transversely of the work, a pair of horizontal gears disposed directly below the tool bar and connected for simultaneous rotation, and each gear including an upstanding pin, the pins being mounted on the gears for adjustment radially thereof to eccentric positions, one pin being turnably secured to the tool bar and the other pin being turnably and longitudinally slidably secured to said bar, whereby upon simultaneous rotation of the gears the relative eccentricity of the pins causes the tool to traverse an accurate path.

A further object of the invention is to provide a simple and inexpensive adjustable tool holder for lathes, and yet one which will be exceedingly effective for the purpose for which it is designed.

These objects are accomplished by means of such structure and relative arrangement of parts as will fully appear by a perusal of the following specification and claims.

In the drawings:

Fig. 4 is an enlarged view, similar to Fig 1, but with the tool bar removed, and partially broken away to show the driving means for the gears. In this view the normally detached adjusting knob is shown in its position of use.

Figure 1:
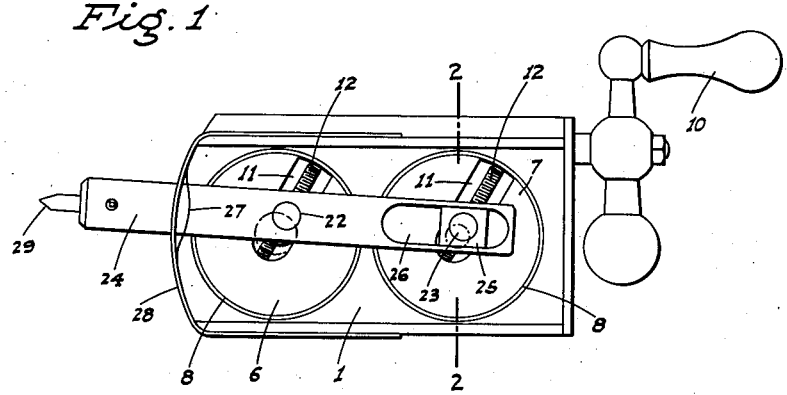
Fig. 1 is a top plan view of the adjustable tool holder, with the cover plate removed.
Figure 2:
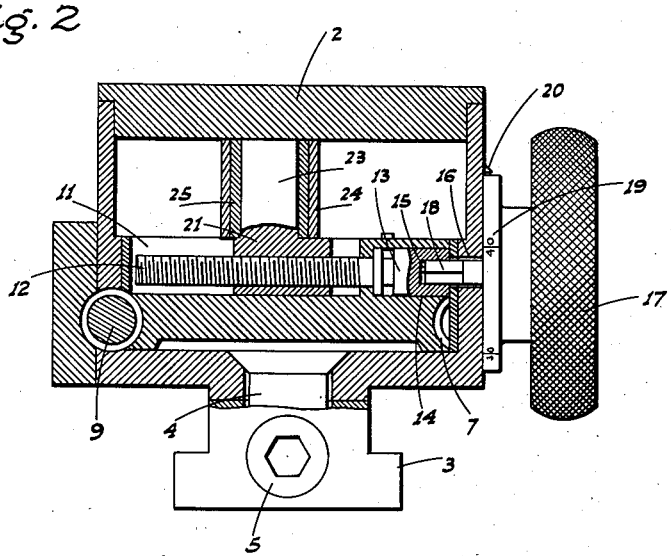
Fig. 2 is an enlarged cross section on line 2—2 of Fig. 1.
Figure 3:
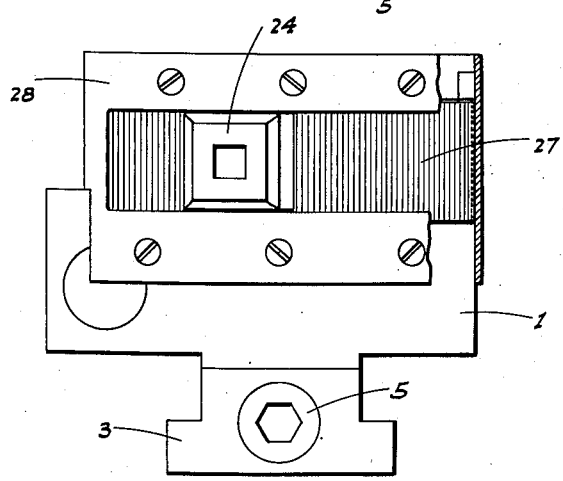
Fig. 3 is a front end view of the tool holder.

Referring now more particularly to the characters of reference on the drawings, the adjustable tool holder for lathes comprises a rigid case, indicated generally at 1, which case is trough-like and includes a removable cover plate 2. The case 1 is elongated and is adapted to be mounted on a lathe slide by means of an inverted T-base 3, secured to the case 1 at the bottom and lengthwise thereof by bolts 4, tightening of which is accomplished by Allen nuts 5. As so mounted on a lathe slide, the case 1 extends

2 longitudinally in a direction transversely of the axis of the work in the lathe.

Within the case 1 it is fitted with a pair of horizontally disposed, longitudinally spaced gears 6 and 7, hereinafter identified as the feed gear and traversing gears, respectively. The gears 6 and 7 are disposed in annular seats 8 formed in the bottom of the case 1, and said gears run in mesh at one side with an actuating screw 9 mounted in the case 1 in a side bore therein. The screw 9 is axially immovable, but is adapted to be rotated by a crank handle 10 at the rear end of the device. The gears 6 and 7, together with the screw 9, are of worm type. Each of the gears 6 and 7 is formed with a radially extending, upwardly opening slot 11, in which an adjustment screw 12 is disposed diametrally of the corresponding gear. Adjacent one end thereof each adjustment screw 12 is formed with a cylindrical head 13 rotatably but axially immovably seated in a bore 14 in the corresponding gear beyond one end of the slot 11.

Each head 13 includes an outwardly opening, non-circular socket 15 adapted to register with an access bore 16 in one side of the case 1 when the corresponding gear is in a certain rotative position.

Each adjustment screw 12 is adapted to be rotated by a normally detached, adjusting knob 17, including a non-circular shank 18 adapted to project through each of the access bores 16 into the corresponding socket 15 when alined therewith. The knob 17 includes a calibrated disc 19 adapted to read on a pointer 20 or the like on the side of the case 1 adjacent each access bore 16. The adjusting knob 17 is of course wholly removed from the device when the latter is in use.

Each of the adjustment screws 12 is threaded through a slide block 21 slidably disposed in the corresponding radial slot 11, and each slide block 21 carries an upstanding pin, said pins being indicated at 22 and 23, corresponding to the gears 6 and 7, respectively. The pins 22 and 23 terminate at their upper ends closely adjacent the bottom of the cover plate 2.

At its forward end the case 1 is initially open downwardly some distance from the cover plate 2, and a rigid elongated tool bar 24 extends into said case from said front end, and within the case lies above the gears 6 and 7 in intersecting relation thereto. The pin 22 is directly journaled in the tool bar 24, while the pin 23 is journaled in a slide block 25 slidable lengthwise of said tool bar in a longitudinal slot 26 therein.

At the front end of the case the tool bar 24 projects through a horizontally movable metal slide 27 which tracks within a slotted front plate 28. This arrangement, while permitting of side to side swinging of the tool bar, prevents access of chips and other foreign matter into the case 1 from its front end.

At its forward and exposed end the tool bar 24 is adapted to support a lathe tool 29.

In use of the above described device, the pins 22 and 23 are set with a predetermined relative eccentricity, which adjustment is accomplished by rotation of the adjustment screws 12 through the medium of the knob 17. The position of relative eccentricity of the pins 22 and 23, which predetermines the arcuate configuration and radii of the cut on the work, is set by the operator by a reading of the calibrated disc 19 on the pointers 20.

After the pins 22 and 23 are set to a predetermined position of relative eccentricity, the crank handle 10 is rotated, in one direction or the other, to cause simultaneous rotation of the gears 6 and 7. When this occurs the feed gear 6 either advances or retracts the tool bar 24, depending upon the type of cut. At the same time the traversing gear 7 imparts relative lateral motion, in one direction or the other, to the rear end of said tool bar. The combination of the motions thus imparted to the tool bar by the pins 22 and 23 upon simultaneous rotation of the gears 6 and 7 causes the tool 29 to traverse an arcuate path, which may be either convex or concave, depending on the setting of the pins and the direction of rotation of the screw 9.

In this manner arcuate cuts, either concave or convex, and of pre-selected radii, can be effectively, accurately and automatically made by the operator by manipulation requiring only rotation of the screw 9 by the crank handle 10.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A lathe-tool holder comprising a mounting case, a pair of rotary members mounted in spaced relation in the case, means to rotate the members in unison, a tool bar extending across the face of both members, a pin projecting from one member parallel to the axis thereof and turnably projecting into the bar, means to adjust the pin radially of the member, another pin projecting from the other member parallel to the axis thereof, means to adjust said other pin radially of said other member, and a block in which said other pin is turnable, the tool bar having a longitudinal slot in which said block slides.

2. A device, as in claim 1, in which the means to adjust either pin comprises, with a radial slot in the corresponding member, a screw turnably mounted in the member and extending along the slot, a block on the pin guided in said slot and through which the screw is threaded, and an element on the outer end of the screw within but exposed to one side of the member for engagement with a screw-turning tool; the member being countersunk in the case and the latter having an opening in one side to register with said element when the member is disposed in a predetermined position in the case.

LOUIS J. SUBER.

REFERENCES CITED

The following references are of record in the file of this patent:

UNITED STATES PATENTS

| Number | Name | Date |
|---|---|---|
| 1,319,585 | Hunt | Oct. 21, 1919 |
| 1,679,912 | Mondloch | Aug. 7, 1928 |
| 2,470,097 | Goulette | May 17, 1949 |

FOREIGN PATENTS

| Number | Country | Date |
|---|---|---|
| 359,320 | France | Mar. 21, 1906 |
| 608,453 | France | July 28, 1926 |